United States Patent
Lee et al.

(10) Patent No.: US 12,504,827 B2
(45) Date of Patent: Dec. 23, 2025

(54) HAPTIC FEEDBACK MODULE AND DEVICE THEREOF WITH HAPTIC FEEDBACK FUNCTION

(71) Applicant: Unictron Technologies Corporation, Hsin-Chu (TW)

(72) Inventors: Cheng-Ta Lee, Tainan (TW); Tai-Yu Kuo, Hsinchu County (TW); Chun-Hsin Liao, Taoyuan (TW)

(73) Assignee: Unictron Technologies Corporation, Hsin-Chu (TW)

( * ) Notice: Subject to any disclaimer, the term of this patent is extended or adjusted under 35 U.S.C. 154(b) by 36 days.

(21) Appl. No.: 18/806,658

(22) Filed: Aug. 15, 2024

(65) Prior Publication Data
US 2025/0348148 A1 Nov. 13, 2025

(30) Foreign Application Priority Data
May 8, 2024 (TW) .................................. 113116945

(51) Int. Cl.
*H04B 3/36* (2006.01)
*G06F 3/01* (2006.01)

(52) U.S. Cl.
CPC .................................. *G06F 3/016* (2013.01)

(58) Field of Classification Search
CPC .......... G06F 3/016; G06F 3/16; G06F 3/0412; G06F 3/04883; H04B 3/36; B60K 37/20; H01L 27/3225; H01L 41/0926
See application file for complete search history.

(56) References Cited

U.S. PATENT DOCUMENTS

| | | | |
|---|---|---|---|
| 10,149,044 B2* | 12/2018 | Behles | H04R 1/288 |
| 2010/0328053 A1 | 12/2010 | Yeh | |
| 2011/0163634 A1 | 7/2011 | Kim | |
| 2012/0050199 A1 | 3/2012 | Wu | |
| 2012/0306790 A1* | 12/2012 | Kyung | G06F 3/016 |
| | | | 345/173 |
| 2021/0183966 A1* | 6/2021 | Kho | H04R 17/00 |
| 2024/0264676 A1* | 8/2024 | Sohn | G06F 3/0412 |

FOREIGN PATENT DOCUMENTS

| | | |
|---|---|---|
| CN | 116820240 A | 9/2023 |
| TW | 201101137 A1 | 1/2011 |

* cited by examiner

*Primary Examiner* — Toan N Pham
(74) *Attorney, Agent, or Firm* — Winston Hsu (57) ABSTRACT

A haptic feedback module is applied to a haptic feedback operation of a device and includes a member to be vibrated, a vibration-transmitting plate, a vibration-transmitting point array, and a vibration component. The member to be vibrated is disposed on the device. The vibration-transmitting plate has an upper vibration-transmitting surface and a lower vibration-transmitting surface opposite to each other. The vibration-transmitting point array is disposed on the upper vibration-transmitting surface and contacts the member to be vibrated. The vibration component is disposed on one of the upper vibration-transmitting surface and the lower vibration-transmitting surface and coupled to the device. When the haptic feedback operation is performed, a vibration energy from the vibration component driven by the device passes through the vibration-transmitting plate and the vibration-transmitting point array sequentially to the member to be vibrated, for providing a haptic feedback to the device.

12 Claims, 7 Drawing Sheets

HAPTIC FEEDBACK MODULE AND DEVICE THEREOF WITH HAPTIC FEEDBACK FUNCTION

BACKGROUND OF THE INVENTION

1. Field of the Invention

The present invention relates to a haptic feedback module and a device thereof, and more specifically, to a haptic feedback module utilizing one single vibration component to transmit a vibration energy to a member to be vibrated via a vibration-transmitting point array of a vibration-transmitting plate and a device thereof.

2. Description of the Prior Art

In general, a haptic feedback module design involves attaching a vibration component (e.g., a piezoelectric actuator) directly to a member to be vibrated (e.g., a touch screen of a mobile phone), so as to transmit vibrations generated by the vibration component to a touch surface of the member to be vibrated when a user performs a haptic feedback operation, thereby providing a vibration tactile feedback for generating the haptic feedback effect.

However, since the aforesaid design adopts one single vibration source directly attached to a specific area on the member to be vibrated, a vibration energy generated by the vibration component cannot be evenly transmitted to different positions on the touch surface of the member to be vibrated, thereby resulting in an uneven vibration feedback problem and greatly affecting a tactile feeling of the haptic feedback operation. On the other hand, if multiple vibration sources are evenly distributed instead of the aforesaid design, it increases the manufacturing cost of the haptic feedback module.

SUMMARY OF THE INVENTION

One purpose of the present invention is to provide a haptic feedback module utilizing one single vibration component to transmit a vibration energy via to a member to be vibrated a vibration-transmitting point array of a vibration-transmitting plate and a device thereof, to solve the aforesaid problems.

According to one embodiment, the present invention provides a haptic feedback module applied to a haptic feedback operation of a device. The haptic feedback module includes a member to be vibrated, a vibration-transmitting plate, a vibration-transmitting point array, and a vibration component. The vibration-transmitting plate has an upper vibration-transmitting surface and a lower vibration-transmitting surface opposite to each other. The vibration-transmitting point array is disposed on the upper vibration-transmitting surface and contacts the member to be vibrated. The vibration component is disposed on one of the upper vibration-transmitting surface and the lower vibration-transmitting surface and connected to the device. When the haptic feedback operation of the device is performed, a vibration energy generated by the vibration component driven by the device sequentially passes through the vibration-transmitting plate and the vibration-transmitting point array and is transmitted to the member to be vibrated, for providing a haptic feedback to the device.

According to another embodiment, the present invention provides a device with a haptic feedback function. The device includes a main body and a haptic feedback module. The haptic feedback module is disposed in the main body. The haptic feedback module includes a member to be vibrated, a vibration-transmitting plate, a vibration-transmitting point array, and a vibration component. The vibration-transmitting plate has an upper vibration-transmitting surface and a lower vibration-transmitting surface opposite to each other. The vibration-transmitting point array is disposed on the upper vibration-transmitting surface and contacts the member to be vibrated. The vibration component is disposed on one of the upper vibration-transmitting surface and the lower vibration-transmitting surface and connected to the main body. When the haptic feedback operation of the main body is performed, a vibration energy generated by the vibration component driven by the main body sequentially passes through the vibration-transmitting plate and the vibration-transmitting point array and is transmitted to the member to be vibrated, for providing a haptic feedback to the main body.

In summary, compared with the prior art directly attaching the vibration component to the member to be vibrated, via the aforesaid indirect vibration transmitting design in which one single vibration component indirectly transmits the vibration energy to the member to be vibrated through the vibration-transmitting point array on the vibration-transmitting plate (i.e., the vibration component does not directly contact the member to be vibrated), the present invention can provide a haptic feedback with uniform vibration to the member to be vibrated. Thus, the present invention can effectively solve the prior art problem that the single vibration source configuration causes an uneven vibration feedback problem and the multiple vibration source configuration increases the manufacturing cost of the haptic feedback module, thereby greatly enhancing a tactile feeling of the haptic feedback operation of the haptic feedback module and reducing the manufacturing cost of the haptic feedback module.

These and other objectives of the present invention will no doubt become obvious to those of ordinary skill in the art after reading the following detailed description of the preferred embodiment that is illustrated in the various figures and drawings.

DETAILED DESCRIPTION

The present invention will now be described more specifically with reference to the following embodiments and the accompanying drawings. Other advantages and effects of the present invention can be easily understood by a person ordinarily skilled in the art in view of the detailed descriptions and the accompanying drawings. The present invention can be implemented or applied to other different embodiments. Certain aspects of the present invention are not limited by the particular details of the examples illustrated herein. Without departing from the spirit and scope of the present invention, the present invention will have other modifications and changes. It should be understood that the appended drawings are not necessarily drawn to scale and the configuration of each component (e.g., the number, shape, position, and size ratio of vibration-transmitting points and acceleration measurement points, the material and manufacturing process of the vibration-transmitting plate, the actuator type of the vibration component, etc.) in the drawings is merely illustrative, not presenting an actual condition of the embodiments.

Figure 1:
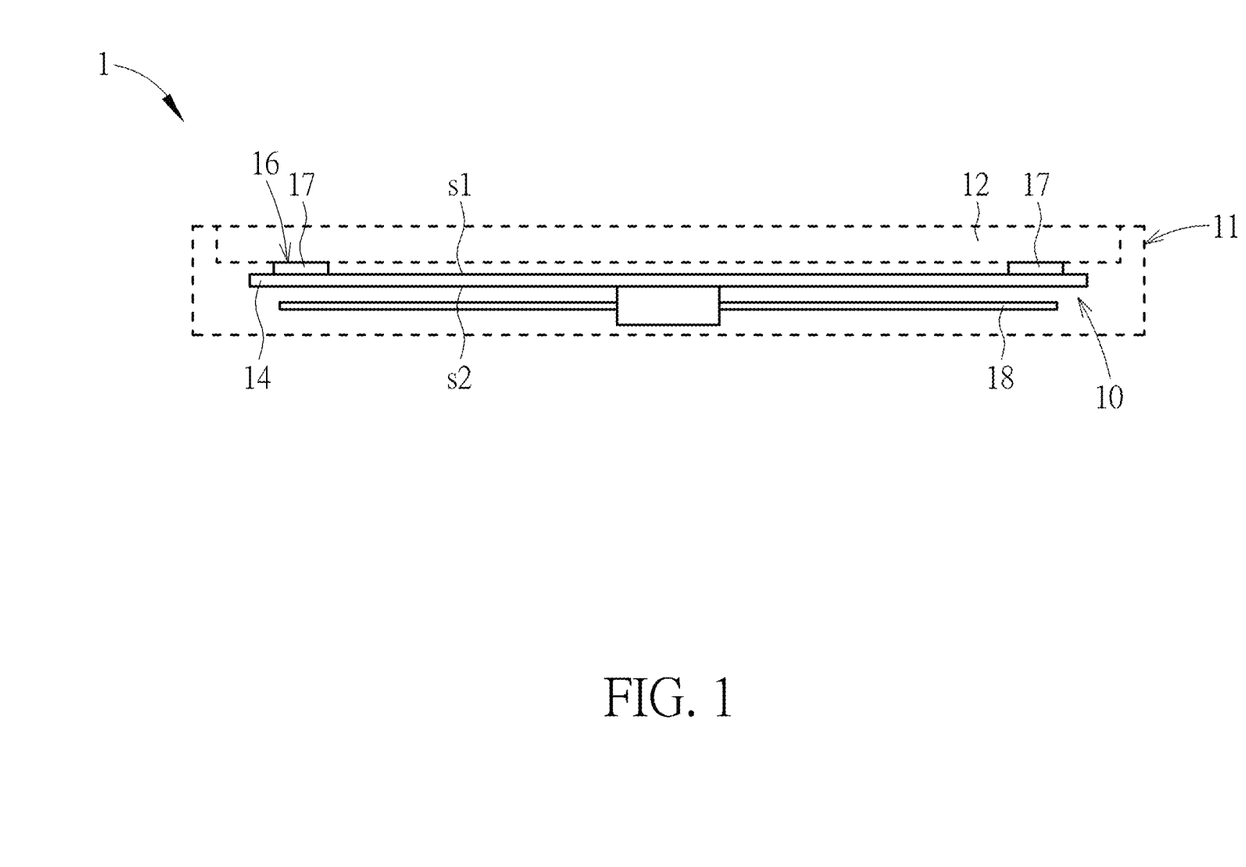
FIG. 1 is a side view of a device according to an embodiment of the invention.
Figure 2:
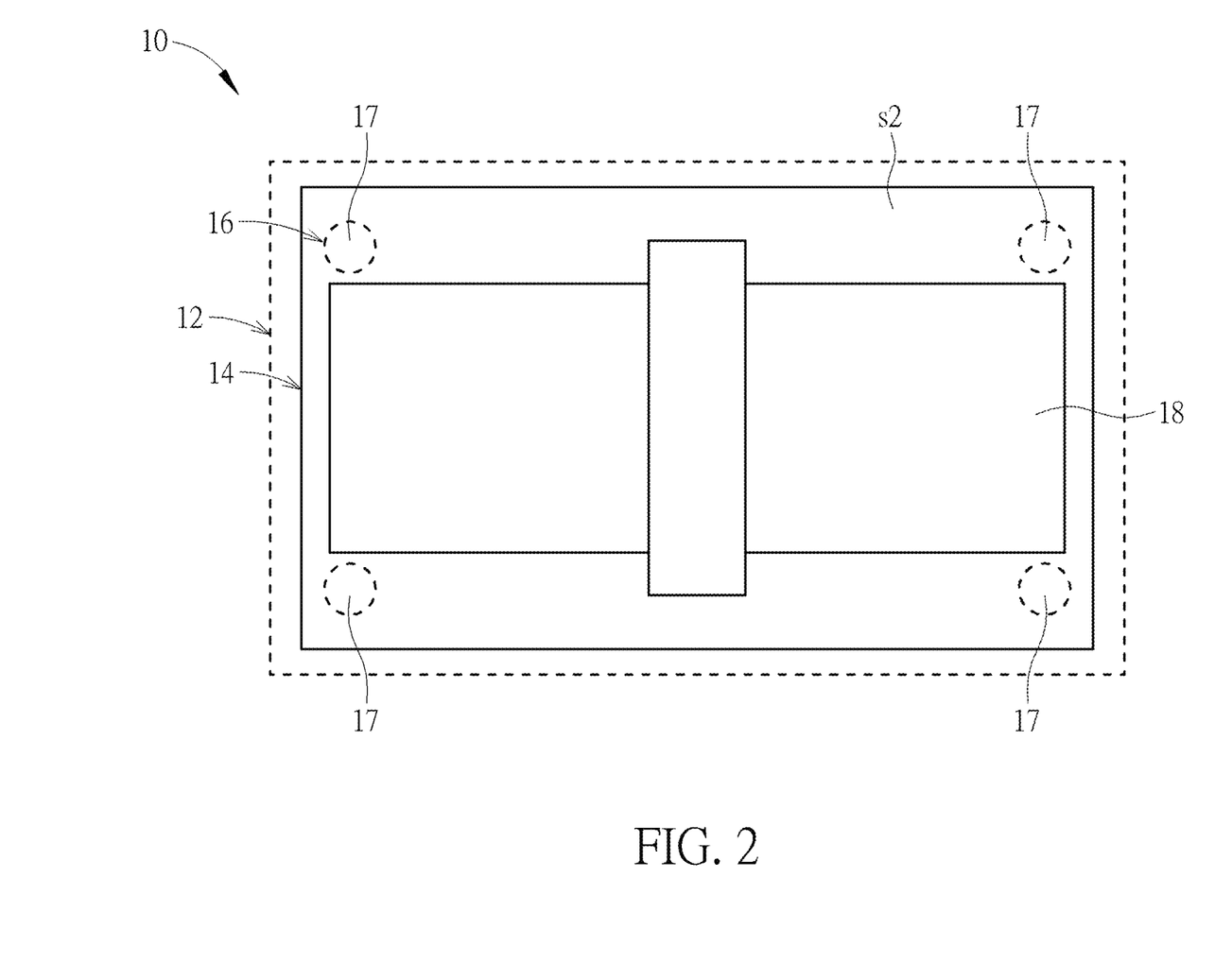
FIG. 2 is a bottom view of a haptic feedback module in FIG. 1.
Figure 3:
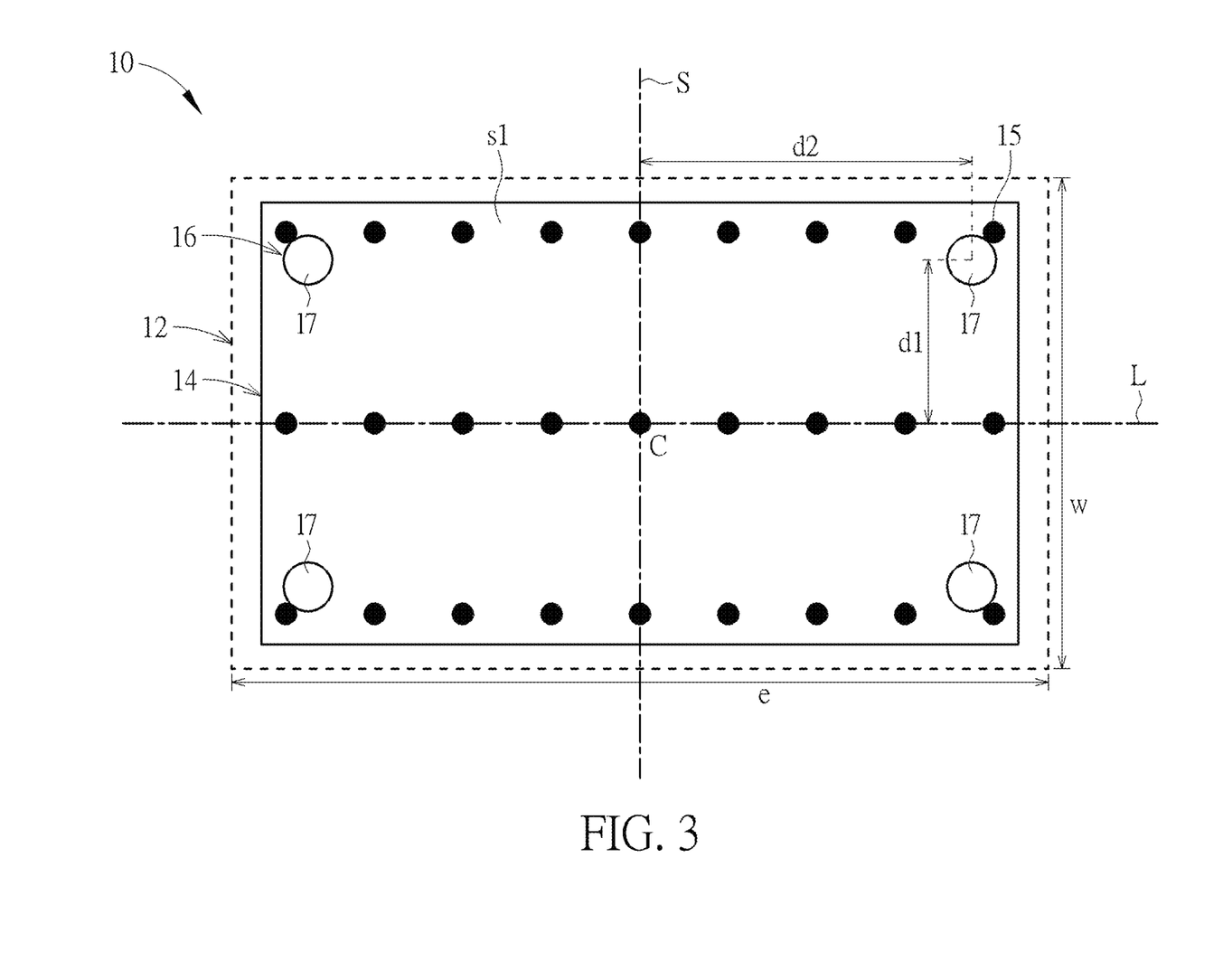
FIG. 3 is a top view of the haptic feedback module in FIG. 1.

Please refer to FIGS. 1, 2, and 3. FIG. 1 is a side view of a device 1 according to an embodiment of the invention. FIG. 2 is a bottom view of a haptic feedback module 10 in FIG. 1. FIG. 3 is a top view of the haptic feedback module 10 in FIG. 1. For clearly showing the component configuration of the haptic feedback module 1, a main body 11 and a member to be vibrated 12 are depicted by dashed lines in figures of the present invention. The device 1 could be any common electronic product with a haptic feedback function (e.g., a smartphone, a notebook, or a vehicle control device, but not limited thereto). As shown in FIGS. 1, 2, and 3, the device 1 includes the main body 11 and the haptic feedback module 10. The main body 11 could include components in the aforementioned electronic products (e.g., a casing, a touch circuit board, a processor, etc.), and the related description is commonly seen in the prior art and omitted herein.

The haptic feedback module 10 is disposed in the main body 11 and includes the member to be vibrated 12, a vibration-transmitting plate 14, a vibration-transmitting point array 16, and a vibration component 18. The member to be vibrated 12 could be a component disposed in the device 1 to receive vibrations and provide a haptic feedback, such as a touch screen of a smartphone, a touchpad of a notebook, or a vehicle touch screen, but not limited thereto. The vibration-transmitting plate 14 has an upper vibration-transmitting surface s1 and a lower vibration-transmitting surface s2 opposite to each other. The vibration-transmitting point array 16 is disposed on the upper vibration-transmitting surface s1 and contacts the member to be vibrated 12 (as shown in FIG. 1). Material of the vibration-transmitting plate 14 could be preferably selected from a rigid vibration-transmitting material group at least consisting of metal material, engineering plastic material, and ceramic material. The vibration-transmitting point array 16 could be preferably formed integrally (e.g., by a metal stamping process, but not limited thereto, meaning that the vibration-transmitting point array 16 could be disposed as a separate component on the vibration-transmitting plate 14 in another embodiment) on the upper vibration-transmitting surface s1 of the vibration-transmitting plate 14. The vibration component 18 could be preferably a piezoelectric actuator disposed on (e.g., by a clamping/locking/bonding method, but not limited thereto, meaning that the present invention could adopt other fixing methods, such as an injection molding process) the lower vibration-transmitting surface s2 (or the upper vibration-transmitting surface s1) and connected to the main body 11. The aforesaid design provides a vibration function via the inverse piezoelectric effect and further provides a touch sensing function via the direct piezoelectric effect. As for the related description for the principles of inverse piezoelectric vibration and direct piezoelectric touch sensing of the piezoelectric actuator, it is commonly seen in the prior art and omitted herein.

Figure 4:
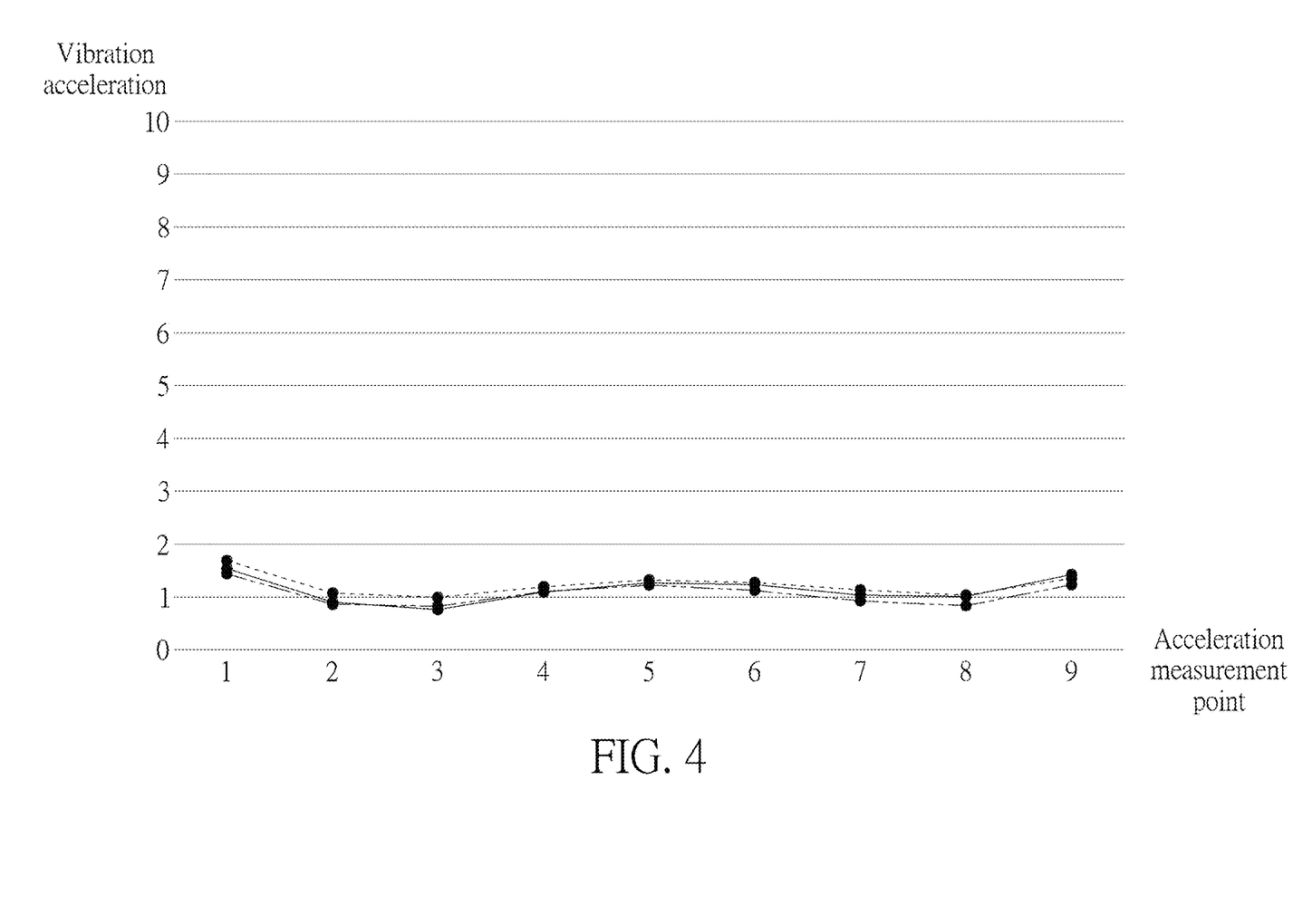
FIG. 4 is a relationship diagram of acceleration measurement points disposed on a member to be vibrated in FIG. 3 and vibration accelerations.

More detailed description for the vibration transmitting design of the haptic feedback module 10 is provided as follows. Please refer to FIGS. 3 and 4. FIG. 4 is a relationship diagram of acceleration measurement points 15 disposed on the member to be vibrated 12 in FIG. 3 and vibration accelerations. As shown in FIGS. 3 and 4, the present invention could preferably utilize twenty-seven acceleration measurement points 15 (but not limited thereto) evenly distributed on the member to be vibrated 12 to measure a vibration acceleration of the member to be vibrated 12 when receiving vibrations transmitted from the vibration component 18 through the vibration-transmitting point array 16. The vibration-transmitting plate 14 and the member to be vibrated 12 could be preferably rectangular, and the vibration-transmitting point array 16 could include four vibration-transmitting points 17. The four vibration-transmitting points 17 are symmetrically arranged in a rectangular configuration relative to a central long axis L and a central short axis S of the member to be vibrated 12. A distance d1 between each vibration-transmitting point 17 and the central long axis L of the vibration-transmitting plate 14 could be preferably between one-fifteenth and two-fifths of a width w of the member to be vibrated 12. A distance d2 between each vibration-transmitting point 17 and the central short axis S of the member to be vibrated 12 could be preferably between one-sixth and five-twelfths of a length e of the member to be vibrated 12. Vibration uniformity mentioned in the present invention could be calculated based on the following formula.

$U=(Max-Min)/(2*Ave)$, wherein U represents the vibration uniformity transmitted by the vibration-transmitting point array 16 to the member to be vibrated 12, Max represents a maximum vibration acceleration measured by the acceleration measurement points 15, Min represents a minimum vibration acceleration measured by the acceleration measurement points 15, and Ave represents an average vibration acceleration measured by the twenty-seven acceleration measurement points 15.

For example, in this embodiment, the length e and the width w of the member to be vibrated 12 could be 150 mm and 90 mm, respectively. The distance d1 could be 31 mm, and the distance d2 could be 61 mm.

Thus, when a haptic feedback operation of the main body 11 is performed, a vibration energy generated by the vibration component 18 is sequentially transmitted through the vibration-transmitting plate 14 and the vibration-transmitting point array 16 to the member to be vibrated 12, thereby providing a haptic feedback to the main body 11. According to the aforesaid formula and FIG. 4, the vibration uniformity measured by the twenty-seven acceleration measurement points 15 is 0.41 (the lower the value, the better the vibration uniformity of the member to be vibrated 12). In other words, compared with the prior art directly attaching the vibration component to the member to be vibrated, via the aforesaid indirect vibration transmitting design in which one single vibration component indirectly transmits the vibration energy to the member to be vibrated through the vibration-transmitting point array on the vibration-transmitting plate (i.e., the vibration component does not directly contact the member to be vibrated), the present invention can provide a haptic feedback with uniform vibration to the member to be vibrated. Thus, the present invention can effectively solve the prior art problem that the single vibration source configuration causes an uneven vibration feedback problem and the multiple vibration source configuration increases the manufacturing cost of the haptic feedback module, thereby greatly enhancing a tactile feeling of the haptic feedback operation of the haptic feedback module and reducing the manufacturing cost of the haptic feedback module.

In practical experience, the value of the vibration uniformity will vary with different distances between the vibration-transmitting points. For example, in another embodiment where the distance d1 is 30 mm and the distance d2 is 56 mm, the vibration uniformity measured by the twenty-seven acceleration measurement points 15 is 0.33. In another embodiment where the distance d1 is 27 mm and the distance d2 is 47.5 mm, the vibration uniformity measured by the twenty-seven acceleration measurement points 15 is 0.38. In another embodiment where the distance d1 is 23.5 mm and the distance d2 is 38.5 mm, the vibration uniformity measured by the twenty-seven acceleration measurement points 15 is 0.45. In another embodiment where the distance d1 is 6.5 mm and the distance d2 is 26 mm, the vibration uniformity measured by the twenty-seven acceleration measurement points 15 is 0.57. As for which distance configuration is adopted, it depends on the practical needs of the haptic feedback module of the present invention.

Figure 5:
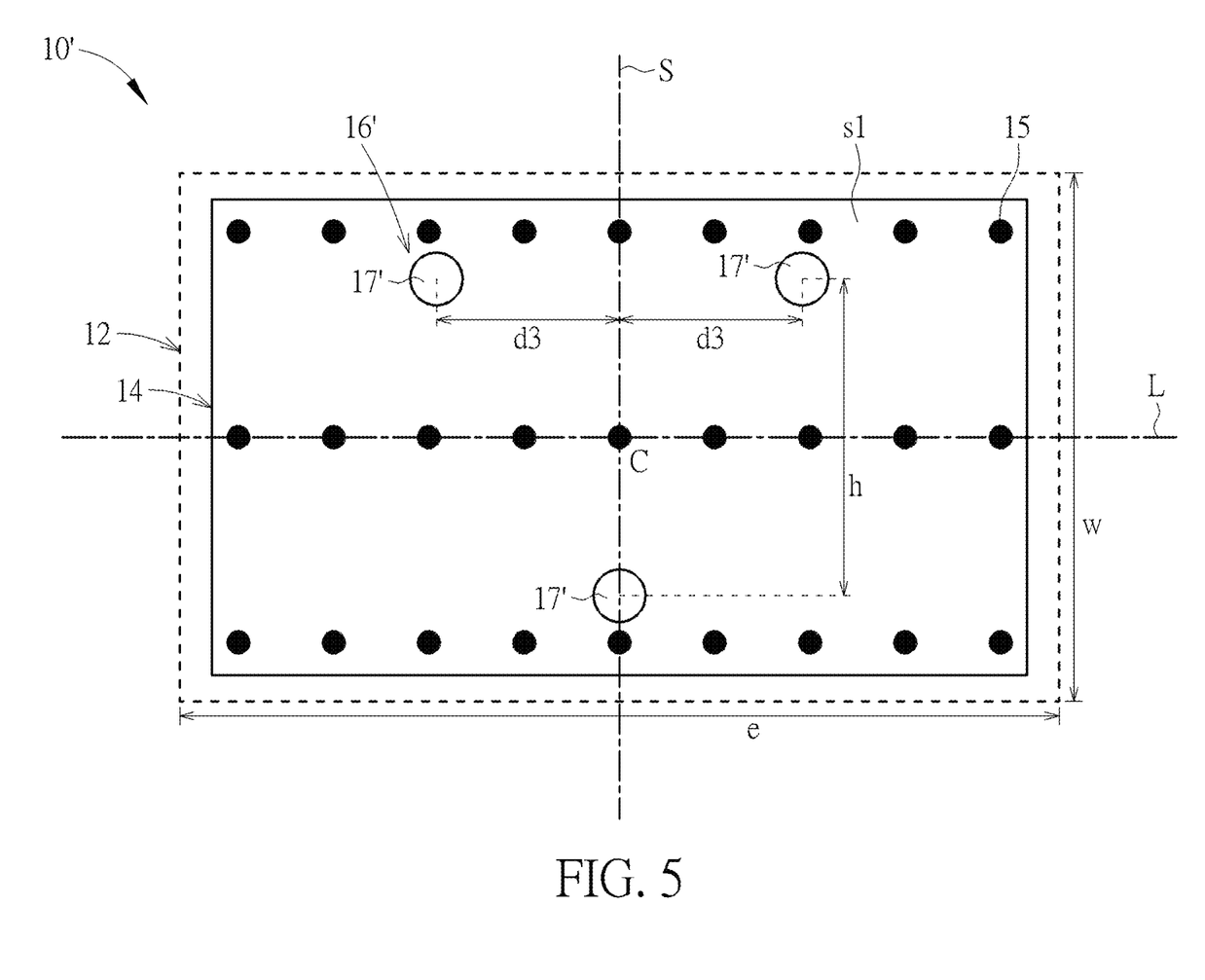
FIG. 5 is a top view of a haptic feedback module according to another embodiment of the present invention.

It should be mentioned that the arrangement design of the vibration-transmitting points adopted by the present invention is not limited to the aforesaid embodiments. For example, please refer to FIG. 5, which is a top view of a haptic feedback module 10' according to another embodiment of the present invention. The member to be vibrated 12 is shown in dashed lines in FIG. 5. Components both mentioned in this embodiment and the aforesaid embodiments represent components with similar structures or functions, and the related description is omitted herein. In this embodiment, the haptic feedback module 10' includes the member to be vibrated 12, the vibration-transmitting plate 14, a vibration-transmitting point array 16', and the vibration component 18 (not shown in FIG. 5, the description of which could be reasoned by analogy according to the aforesaid embodiments). The vibration-transmitting point array 16' is arranged on the upper vibration-transmitting surface s1 of the vibration-transmitting plate 14 and contacts the member to be vibrated 12. As shown in FIG. 5, the present invention uses twenty-seven acceleration measurement points 15 (but not limited thereto) evenly distributed on the member to be vibrated 12 to measure the vibration acceleration of the member to be vibrated 12 when receiving vibrations transmitted from the vibration component 18 through the vibration-transmitting point array 16'. The vibration-transmitting plate 14 and the member to be vibrated 12 could be preferably rectangular, and the vibration-transmitting point array 16' could include three vibration-transmitting points 17'. The three vibration-transmitting points 17' are symmetrically arranged in a triangular configuration relative to the central short axis S of the member to be vibrated 12. A distance d3 of the two vibration-transmitting points 17' at a bottom of the triangular configuration from the central short axis S could be preferably between one-fifth and two-fifths of the length e of the member to be vibrated 12. A height h of the triangular configuration along the central short axis S could be preferably between one-half and four-fifths of the width w of the member to be vibrated 12.

For example, in this embodiment, the length e and the width w of the member to be vibrated 12 are 150 mm and 90 mm, respectively. The distance d3 is 31.2 mm, and the height h is 54 mm. Thus, when a haptic feedback operation of the main body 11 is performed, a vibration energy generated by the vibration component 18 is sequentially transmitted through the vibration-transmitting plate 14 and the vibration-transmitting point array 16' to the member to be vibrated 12, thereby providing a haptic feedback to the main body 11. According to the aforesaid formula and the measured acceleration values, the vibration uniformity measured by the twenty-seven acceleration measurement points 15 is 0.63. Similarly, in practical experience, the value of the vibration uniformity will vary with different distances between the vibration-transmitting points. For example, in another embodiment where the distance d1 is 56 mm and the height h is 60 mm, the vibration uniformity measured by the twenty-seven acceleration measurement points 15 is 0.64. As for which distance configuration is adopted, it depends on the practical needs of the haptic feedback module of the present invention.

Figure 6:
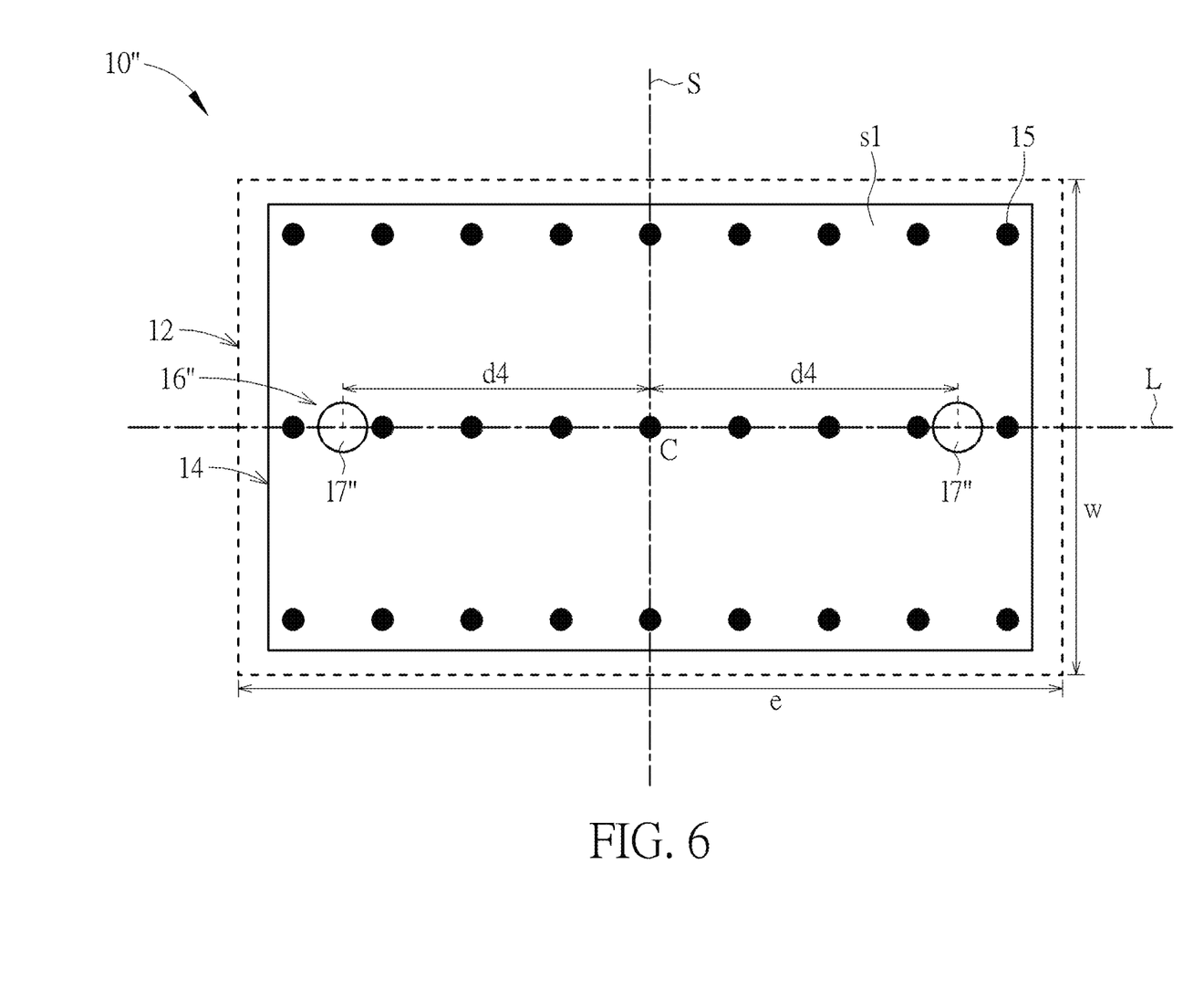
FIG. 6 is a top view of a haptic feedback module according to another embodiment of the present invention.

Furthermore, the present invention could also adopt a linear arrangement design of the vibration-transmitting points. For example, please refer to FIG. 6, which is a top view of a haptic feedback module 10" according to another embodiment of the present invention. The member to be vibrated 12 is shown in dashed lines in FIG. 6. Components both mentioned in this embodiment and the aforesaid embodiments represent components with similar structures or functions, and the related description is omitted herein. In this embodiment, the haptic feedback module 10" includes the member to be vibrated 12, the vibration-transmitting plate 14, a vibration-transmitting point array 16", and the vibration component 18 (not shown in FIG. 6, the description of which could be reasoned by analogy according to the aforesaid embodiments). The vibration-transmitting point array 16" is arranged on the upper vibration-transmitting surface s1 of the vibration-transmitting plate 14 and contacts the member to be vibrated 12. As shown in FIG. 6, the present invention uses twenty-seven acceleration measurement points 15 (but not limited thereto) evenly distributed on the member to be vibrated 12 to measure the vibration acceleration generated by the member to be vibrated 12 when receiving vibrations transmitted from the vibration component 18 through the vibration-transmitting point array 16". The vibration-transmitting plate 14 and the member to be vibrated 12 could be preferably rectangular, and the vibration-transmitting point array 16" could include two vibration-transmitting points 17". The two vibration-transmitting points 17" are symmetrically arranged relative to a center C of the member to be vibrated 12 along the central long axis L. A distance d4 of each vibration-transmitting point 17" from the center C is between one-fifth and two-fifths of the length e of the member to be vibrated 12.

For example, in this embodiment, the length e and the width w of the member to be vibrated 12 could be 150 mm and 90 mm, respectively, and the distance d4 could be 56 mm. Thus, when a haptic feedback operation of the main body 11 is performed, a vibration energy generated by the vibration component 18 is sequentially transmitted through the vibration-transmitting plate 14 and the vibration-transmitting point array 16" to the member to be vibrated 12, thereby providing a haptic feedback to the main body 11. According to the aforesaid formula and the measured acceleration values, the vibration uniformity measured by the twenty-seven acceleration measurement points 15 is 0.42. Similarly, in practical experience, the value of the vibration uniformity will vary with different distances between the vibration-transmitting points. For example, in another embodiment where the distance d4 is 37.5 mm, the vibration uniformity measured by the twenty-seven acceleration measurement points 15 is 0.84. As for which distance configuration is adopted, it depends on the practical needs of the haptic feedback module of the present invention.

Figure 7:
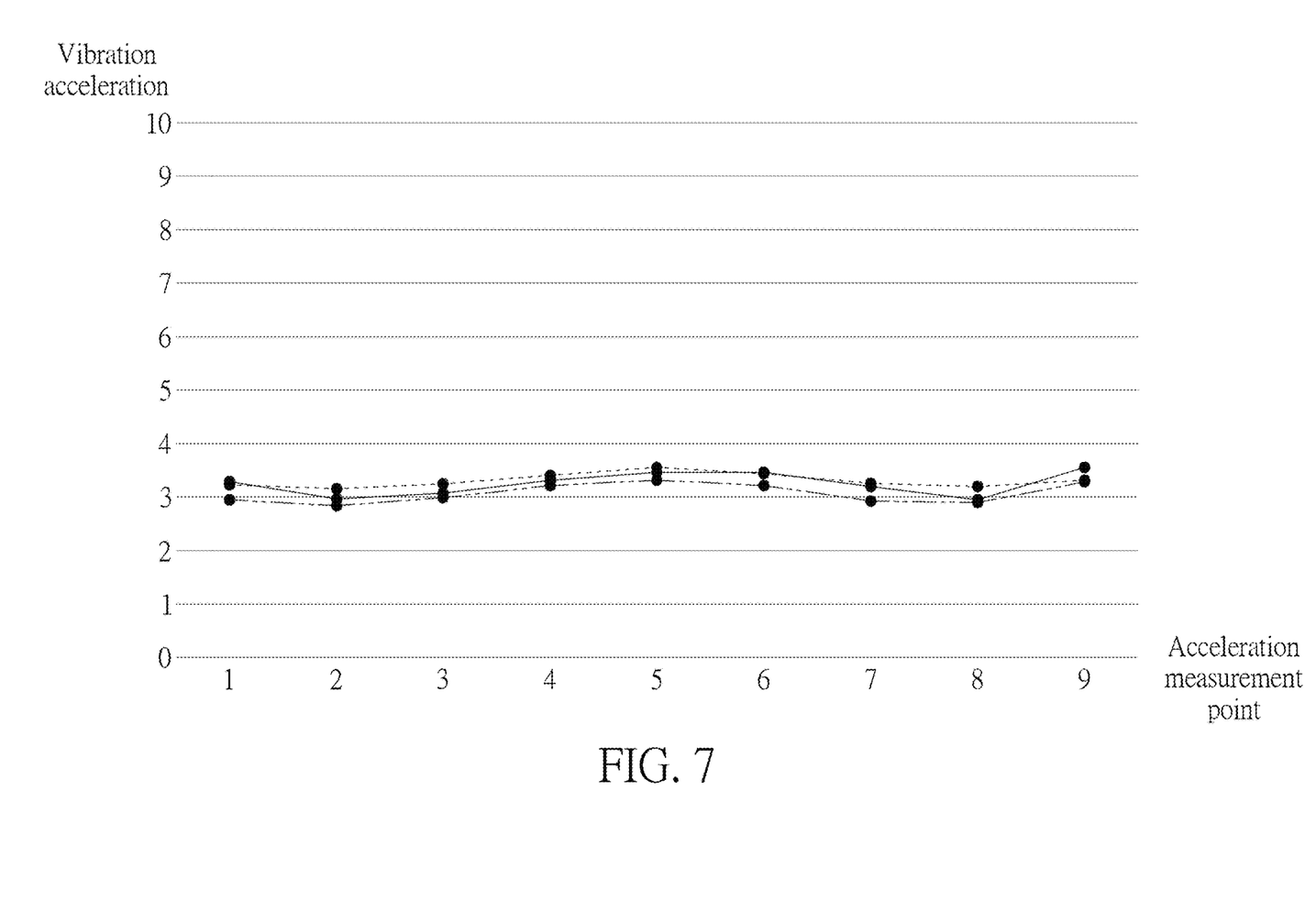
FIG. 7 is a relationship diagram of the acceleration measurement points and measured vibration accelerations when using a linear resonant actuator according to another embodiment of the present invention.

To be noted, in practical applications, the type of vibration component adopted by the present invention is not limited to the piezoelectric actuator mentioned in the above embodiments. The present invention could also adopt other types of vibration actuators, such as an LRA (Linear Resonant Actuator) or an ERM (Eccentric Rotating Mass) vibration motor. For example, please refer to FIG. 7, which is a relationship diagram of the acceleration measurement points 15 and measured vibration accelerations when using a linear resonant actuator according to another embodiment of the present invention. That is, in the embodiment where the length e and the width w of the member to be vibrated 12 are 150 mm and 90 mm, respectively, the distance d1 is 30 mm, and the distance d2 is 56 mm (not shown in FIG. 7, the arrangement design of the vibration-transmitting points could be reasoned by analogy according to FIG. 3), according to the above formula and FIG. 7, the vibration uniformity measured by the twenty-seven acceleration measurement points 15 is 0.11. Similarly, in practical experience, the value of the vibration uniformity will vary with different distances between the vibration-transmitting points. For example, in another embodiment where the distance d1 is 27 mm and the distance d2 is 47.5 mm, the vibration uniformity measured by the twenty-seven acceleration measurement points 15 is 0.32. In another embodiment where the distance d1 is 23.5 mm and the distance d2 is 38.5 mm, the vibration uniformity measured by the twenty-seven acceleration measurement points 15 is 0.29. As for which distance configuration is adopted, it depends on the practical needs of the haptic feedback module of the present invention.

Moreover, the arrangement design of the vibration-transmitting point array adopted by the present invention is not limited to the symmetrical arrangement designs mentioned in the above embodiments. In other words, as long as a single vibration component indirectly transmits vibration energy to the member to be vibrated through the vibration-transmitting point array on the vibration-transmitting plate (arranged symmetrically or asymmetrically), it falls within the scope of the present invention. As for which point array configuration is adopted, it depends on the practical needs of the haptic feedback module of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A haptic feedback module applied to a haptic feedback operation of a device, the haptic feedback module comprising:
   a member to be vibrated, disposed on the device;
   a vibration-transmitting plate having an upper vibration-transmitting surface and a lower vibration-transmitting surface opposite to each other;
   a vibration-transmitting point array disposed on the upper vibration-transmitting surface and contacting the member to be vibrated; and
   a vibration component disposed on one of the upper vibration-transmitting surface and the lower vibration-transmitting surface and connected to the device;
   wherein when the haptic feedback operation of the device is performed, a vibration energy generated by the vibration component driven by the device sequentially passes through the vibration-transmitting plate and the vibration-transmitting point array and is transmitted to the member to be vibrated, for providing a haptic feedback to the device.

2. The haptic feedback module of claim 1, wherein the vibration component is selected from a vibration actuator group at least consisting of a piezoelectric actuator, a linear resonant actuator, and an eccentric rotating mass vibration motor.

3. The haptic feedback module of claim 1, wherein the vibration-transmitting plate is made of a rigid vibration-transmitting material selected from a group at least consisting of metal material, engineering plastic material, and ceramic material.

4. The haptic feedback module of claim 3, wherein the vibration-transmitting point array is integrally formed on the upper vibration-transmitting surface of the vibration-transmitting plate.

5. The haptic feedback module of claim 4, wherein the vibration-transmitting plate is made of metal material, and the vibration-transmitting point array is formed on the upper vibration-transmitting surface of the vibration-transmitting plate by a metal stamping process.

6. The haptic feedback module of claim 1, wherein the vibration-transmitting plate and the member to be vibrated are rectangular, and the vibration-transmitting point array comprises two vibration-transmitting points symmetrically arranged relative to a center of the member to be vibrated along a central long axis of the member to be vibrated.

7. The haptic feedback module of claim 6, wherein a distance between each vibration-transmitting point and the center is between one-fifth and two-fifths of a length of the member to be vibrated.

8. The haptic feedback module of claim 1, wherein the vibration-transmitting plate and the member to be vibrated are rectangular, and the vibration-transmitting point array comprises three vibration-transmitting points symmetrically arranged in a triangular configuration relative to a central short axis of the member to be vibrated.

9. The haptic feedback module of claim 8, wherein the two vibration-transmitting points at a bottom of the triangular configuration have a distance from the central short axis of the member to be vibrated, respectively, and the distance is between one-fifth and two-fifths of a length of the member to be vibrated; a height of the triangular configuration along the central short axis of the member to be vibrated is between one-half and four-fifths of a width of the member to be vibrated.

10. The haptic feedback module of claim 1, wherein the vibration-transmitting plate and the member to be vibrated are rectangular, and the vibration-transmitting point array comprises four vibration-transmitting points symmetrically arranged in a rectangular configuration relative to a central long axis and a central short axis of the member to be vibrated.

11. The haptic feedback module of claim 10, wherein a distance between each vibration-transmitting point and the central long axis is between one-fifteenth and two-fifths of a width of the member to be vibrated, and a distance between each vibration-transmitting point and the central short axis is between one-sixth and five-twelfths of a length of the member to be vibrated.

12. A device with a haptic feedback function, the device comprising:
   a main body; and
   a haptic feedback module disposed in the main body, the haptic feedback module comprising:
   a member to be vibrated;

a vibration-transmitting plate having an upper vibration-transmitting surface and a lower vibration-transmitting surface opposite to each other;
a vibration-transmitting point array disposed on the upper vibration-transmitting surface and contacting the member to be vibrated; and
a vibration component disposed on one of the upper vibration-transmitting surface and the lower vibration-transmitting surface and connected to the main body;
wherein when the haptic feedback operation of the main body is performed, a vibration energy generated by the vibration component driven by the main body sequentially passes through the vibration-transmitting plate and the vibration-transmitting point array and is transmitted to the member to be vibrated, for providing a haptic feedback to the main body.

* * * * *